(12) United States Patent
Galante et al.

(10) Patent No.: US 7,730,747 B2
(45) Date of Patent: Jun. 8, 2010

(54) METHOD FOR VAPORIZING A LIQUID REACTANT IN MANUFACTURING A GLASS PREFORM

(75) Inventors: Marco Galante, Pieve Del Cairo (IT); Marco Arimondi, Pavia (IT); Giacomo Stefano Roba, Monza (IT); Ilenia Santi, Gessate (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 1002 days.

(21) Appl. No.: 10/516,170

(22) PCT Filed: Jun. 28, 2002

(86) PCT No.: PCT/EP02/07165

§ 371 (c)(1),
(2), (4) Date: Aug. 2, 2005

(87) PCT Pub. No.: WO2004/002909

PCT Pub. Date: Jan. 8, 2004

(65) Prior Publication Data
US 2006/0010922 A1    Jan. 19, 2006

(51) Int. Cl.
*C03B 37/016* (2006.01)
(52) U.S. Cl. .............. 65/379; 65/413; 65/430; 118/726
(58) Field of Classification Search ............ 65/379, 65/413, 430; 118/726
See application file for complete search history.

(56) References Cited

U.S. PATENT DOCUMENTS

| | | | |
|---|---|---|---|
| 4,314,837 A | 2/1982 | Blankenship | |
| 4,529,427 A * | 7/1985 | French | 65/417 |
| 5,078,092 A | 1/1992 | Antos et al. | |
| 5,090,985 A | 2/1992 | Soubeyrand et al. | |
| 5,356,451 A | 10/1994 | Cain et al. | |
| 5,703,191 A * | 12/1997 | Henderson et al. | 528/31 |
| 5,707,415 A | 1/1998 | Cain | |

(Continued)

FOREIGN PATENT DOCUMENTS

EP    0 058 571 A1    8/1982

(Continued)

OTHER PUBLICATIONS

Berenson, "Film Boiling Heat Transfer from a Horizontal Surface", Journal of Heat Transfer, pp. 351-361, (1961).

(Continued)

*Primary Examiner*—John Hoffmann
(74) *Attorney, Agent, or Firm*—Finnegan, Henderson, Farabow, Garrett & Dunner, L.L.P.

(57) ABSTRACT

A method and device for vaporizing a liquid reactant. A vaporizing plate having a top surface defines a liquid flow channel, the channel being laterally delimited by edges having a height greater than a minimum thickness of liquid reactant required to generate vapor under film or nucleate boiling regime. A heating system is associated to the vaporizing plate for heating the liquid reactant over a minimum temperature required to generate vapor under nucleate or, preferably, film boiling regime. A cap covers the vaporizing plate to collect the vapor at a predetermined pressure and provided with a vapor exit and a liquid feeder feeds the liquid reactant onto the vaporizing plate.

6 Claims, 5 Drawing Sheets

U.S. PATENT DOCUMENTS 5,795,446 A * 8/1998 Kirschmann .................. 203/49
6,734,405 B2 * 5/2004 Centanni et al. ............ 219/628

FOREIGN PATENT DOCUMENTS

| EP | 0 635 460 | A2 | 1/1995 |
| EP | 0 719 575 | A2 | 7/1996 |
| JP | 6-256036 | | 9/1994 |

OTHER PUBLICATIONS

Incropera et al., "Boiling and Condensation", Third Edition, Introduction to Heat Transfer, John Wiley & Sons, N.Y., pp. 503-505, (1996).

* cited by examiner

METHOD FOR VAPORIZING A LIQUID REACTANT IN MANUFACTURING A GLASS PREFORM

CROSS REFERENCE TO RELATED APPLICATION

This application is a national phase application based on PCT/EP2002/007165, filed Jun. 28, 2002, the content of which is incorporated herein by reference.

FIELD OF THE INVENTION

The present invention relates to a method and a device for vaporizing a liquid reactant in an intermediate step of a process for the manufacturing of an optical fibre, in particular in the step of producing a glass soot preform that will be successively drawn into the optical fibre. For producing the glass soot preform, the vapor reactant is fed to a burner for the generation of a stream of glass soot, which is deposited onto a deposition target.

BACKGROUND ART

Optical fibres for telecommunication typically are high-purity, silica-based glass fibres drawn from glass preforms, which preforms can be produced according to various glass deposition techniques.

Some of these deposition techniques, including vapor axial deposition (VAD) and outside vapor deposition (OVD), require the use of a combustion burner for generating glass soot particles to be deposited. This burner is usually fed with a silica precursor, such as $SiCl_4$, together with combusting gases, so that a high temperature flow of forming fine glass (i.e. $SiO_2$) particles is generated. This flow is directed onto a rotating target for growing a glass soot preform, which is subsequently consolidated for obtaining a glass preform. Optionally, the burner may be fed also with a doping material, such as $GeCl_4$, for suitably modifying the refractive index of the glass.

The different gases are provided to the burner by means of a gas delivery system, comprising gas sources and pipe connections. It is important to have a glass precursor material source able to generate the precursor material at a controlled rate, without undesired fluctuations in time.

Several types of gas delivery systems and gas sources are known in the art for such a use.

U.S. Pat. No. 4,314,837 relates to a method for delivering vaporous source materials to an oxidizing reaction flame or the like. Each constituent (for example $SiO_2$, $GeO_2$ and $B_2O_3$) is maintained in liquefied form in an enclosed container that is provided with a heater for raising the temperature of the liquid to a value sufficient to provide a predetermined vapor pressure within the reservoir. The resultant vapours are transferred by means of individually controlled metering means and appropriate conduits to the reaction device. Oxygen may be added to the vapour-conveying conduit or directly to the vapor utilization device. The reservoirs may be commercially-available pressurized tanks. The reservoir pressure is monitored, and the information thus derived is used to control the operation of heaters. Mass flow controllers are provided in the different lines, so that the mass flow rates of the vapours can be controlled.

The Applicant has verified that such a vaporizer has the drawback of being subject to undesired pressure fluctuations. The Applicant also observes that the presence of these reservoirs inside the laboratories wherein researchers and technicians have to operate may be dangerous, because of leakage risk. Moreover, the Applicant notices that the described system requires the use of mass flow controllers, which are expensive and fragile devices, along the vapor flow lines, i.e. in hot points of the system, where they are subjected to errors or failures. The Applicant also observes that these tanks have to contain a relatively large amount of liquid and are therefore cumbersome.

U.S. Pat. No. 5,707,415 discloses a vaporizer (film evaporator) for halide-free, silicon-containing liquid reactants used in producing preforms. The vaporizer includes a plurality of packed-bed columns surrounding a central tube. A mixture of liquid reactant, e.g., octamethylcyclotetrasiloxane, and gas, e.g., oxygen, is sprayed onto the top surfaces of the columns by a set of spray nozzles. The liquid reactant and the gas flow downward together through the columns and are heated by hot oil that flows around the columns' walls. The liquid reactant evaporates into the gas until the dew point temperature is reached, at which point all of the liquid reactant will have been converted into vapour. The vapour/gas mixture exits the bottom surfaces of columns, where its direction of flow changes from downward to upward. This change in flow direction separates higher molecular weight species from the vapour/gas mixture. The vapour/gas mixture leaves the vaporizer through central tube and is supplied to soot-producing burners where it is used to produce preforms.

U.S. Pat. No. 5,078,092 relates to a system for delivering a liquid reactant at high flow rates to an oxidation/flame hydrolysis glass soot deposition site. A first liquid reactant ($TiCl_4$) is delivered onto an inner surface of a flash vaporization chamber to form a thin film and is mixed with oxygen after vaporization. Additional vaporized reactants ($SiCl_4$) are thereafter mixed with the vaporized first liquid prior to delivery to an oxidation/flame hydrolysis burner to form a glass soot outer cladding layer on a soot preform. Said inner surface of the flash vaporization chamber is defined by a heating element, whose temperature is maintained below the temperature at which nucleate or film boiling of the liquid occurs.

U.S. Pat. No. 5,356,451 relates to a method and apparatus for providing reactant vapours to a utilization site. The apparatus includes a vaporization chamber enclosed by top and bottom walls, side walls and first and second end walls. The first end wall is elevated with respect to the second end wall. The reactant is supplied in liquid form to a flow distributor that delivers the liquid to that portion of the bottom wall near the first end wall. The angle with which the bottom wall is inclined with respect to horizontal is sufficient to cause the liquid to flow down the bottom wall at a rate sufficient to form a film, the thickness of which is smaller than that thickness which would support a bubble during heating of the film (i.e. no boiling occurs). The surface is heated to a temperature greater than the boiling point of the liquid, thereby converting the liquid reactant to a vapor that is delivered to the vapor utilization site.

An object of the present invention is to provide an alternative type of vaporizer, which guarantees high vaporization rates, which is safe and which has reduced dimensions.

SUMMARY OF THE INVENTION

The Applicant has found that, by flowing a liquid reactant onto a heated surface along a predetermined path delimited by edges, wherein the temperature of the surface, the height of the edges and the flow rate of the liquid are such as to have vaporization under nucleate boiling regime or film boiling regime, it is possible to obtain vaporization at a high rate in a reduced space. Film and nucleate boiling regimes are two of the possible boiling regimes of a liquid, as known in the art and later explained in greater detail. The liquid vaporization technique of the present invention can advantageously be used in a high-rate deposition process for the production of a glass soot preform, which can successively be consolidated and drawn into an optical fibre.

The vaporizing device, which comprises a vaporizing plate defining the heated surface and a cap covering the vaporizing plate for collecting the vapour, may be advantageously placed in a different room with respect to the liquid tank, thus avoiding risks for the technicians operating inside the room of the vaporizing device.

According to a first aspect thereof, the present invention thus relates to a method for vaporizing liquid reactants in a process for producing a glass soot preform, comprising forming a continuous stream of liquid reactant having a thickness sufficient for generating vapor under film or nucleate boiling regime; and heating said stream of liquid reactant at a temperature sufficient for generating vapor under film or nucleate boiling regime.

The step of forming a continuous stream of liquid reactant preferably comprises continuously flowing the liquid reactant into a channel, which is preferably horizontal and is preferably delimited by lateral walls whose height is equal to at least said thickness.

Moreover, heating the stream of liquid reactant preferably comprises heating a surface delimiting said channel.

Advantageously, the method further comprises the steps of collecting said vapor so as to reach a predetermined pressure and conveying said vapor subjected to said pressure to a vapor utilization site.

The method may further comprise flowing said stream of liquid reactant into a further channel positioned at a lower level with respect to said channel.

According to a second aspect, the present invention relates to a process for manufacturing a glass preform, comprising vaporizing a liquid reactant to generate a vapor reactant, feeding said vapor reactant to a burner for forming glass soot particles and depositing said glass soot particles onto a deposition target to grow said glass preform, wherein the step of vaporizing a liquid reactant is performed according to a method as previously described.

In a further aspect thereof, the present invention relates to a vaporizing plate for vaporizing a liquid reactant, comprising an upper portion defining a vaporization surface and having a plurality of walls extending over the vaporization surface to delimit a liquid flow channel, and a further portion suitable to be associated to a heating system and to transfer heat to the vaporization surface.

The liquid reactant is preferably $SiCl_4$ and said walls preferably have a height greater than the minimum thickness of $SiCl_4$ required to generate vapor under a film or nucleate boiling regime.

Preferably, the vaporizing plate is a metallic disk-like plate.

In a first embodiment, the plurality of walls comprises a plurality of concentric annular walls delimiting a plurality of channel sectors and each annular wall has an opening to allow liquid passage from one channel sector to the other. In this embodiment, the plurality of annular walls preferably comprises at least a couple of annular walls having the respective openings positioned diametrically opposite to each other.

In a different embodiment, the channel has a spiral-like portion.

The further portion suitable to be associated to a heating system may define a seat suitable to host a metal wire.

The channel may have at least a well in an end portion thereof to collect residual liquid, and the well may be associated with a respective liquid sensor.

In a further aspect thereof, the present invention relates to a device for vaporizing a liquid reactant, comprising a vaporizing plate as previously described, for receiving the liquid reactant and forming a stream thereof, and a heating system associated with said vaporizing plate for heating said liquid reactant above a minimum temperature required to generate vapor under film or nucleate boiling regime.

Preferably, the device further comprises a liquid feeder, for feeding the liquid reactant onto a vaporizing surface of said vaporizing plate, a cover positioned over said surface, for forming a vaporizing chamber suitable to collect the vapor, and an exit duct to allow the vapor to exit said vaporizing chamber.

The liquid feeder preferably comprises a liquid flow line provided with a flow control valve.

The device may advantageously comprise a pressure sensor positioned inside the vaporizing chamber and a control circuit to control the operation of said flow control valve according to a signal of said pressure sensor.

The device may also comprise at least a further vaporizing plate as previously described, positioned underneath said vaporizing plate for receiving a residual portion of said stream of liquid reactant from said vaporizing plate, and at least a further heating system associated to said further vaporizing plate.

DESCRIPTION OF PREFERRED EMBODIMENTS

Figure 1:
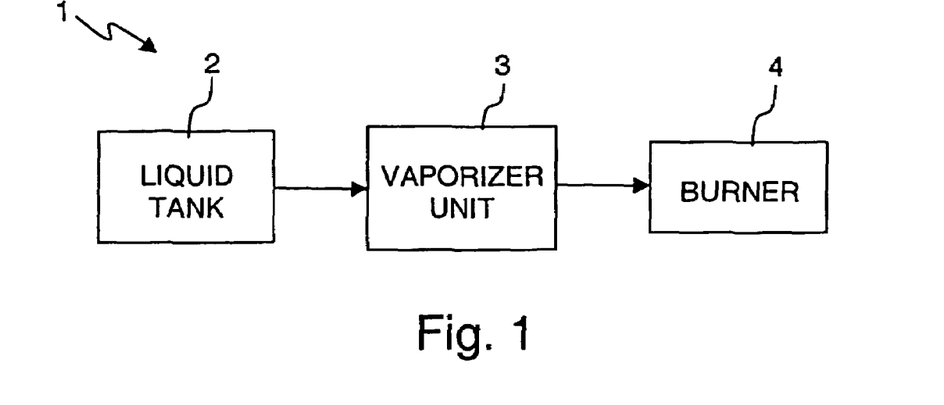
FIG. 1 is a schematic representation of a glass soot deposition apparatus to be used for manufacturing a glass soot preform.

With reference to FIG. 1, it is indicated with 1, as a whole, a glass soot deposition apparatus to be used in a process for manufacturing a glass soot preform, which can be successively consolidated and drawn into an optical fiber.

Deposition apparatus 1 comprises a pressurized tank 2 apt to contain a liquid reactant (in particular, a glass precursor material) to be vaporized, a vaporizing unit 3 for vaporizing the liquid reactant and a burner 4 for receiving the vapor reactant from the vaporizing unit 3 and generating a stream of glass soot particles. In particular, the burner 4 is apt to generate a flame wherein the vapor reactant is transformed into particles, which particles are deposited onto a rotating target for growing the glass soot preform.

Figure 2:
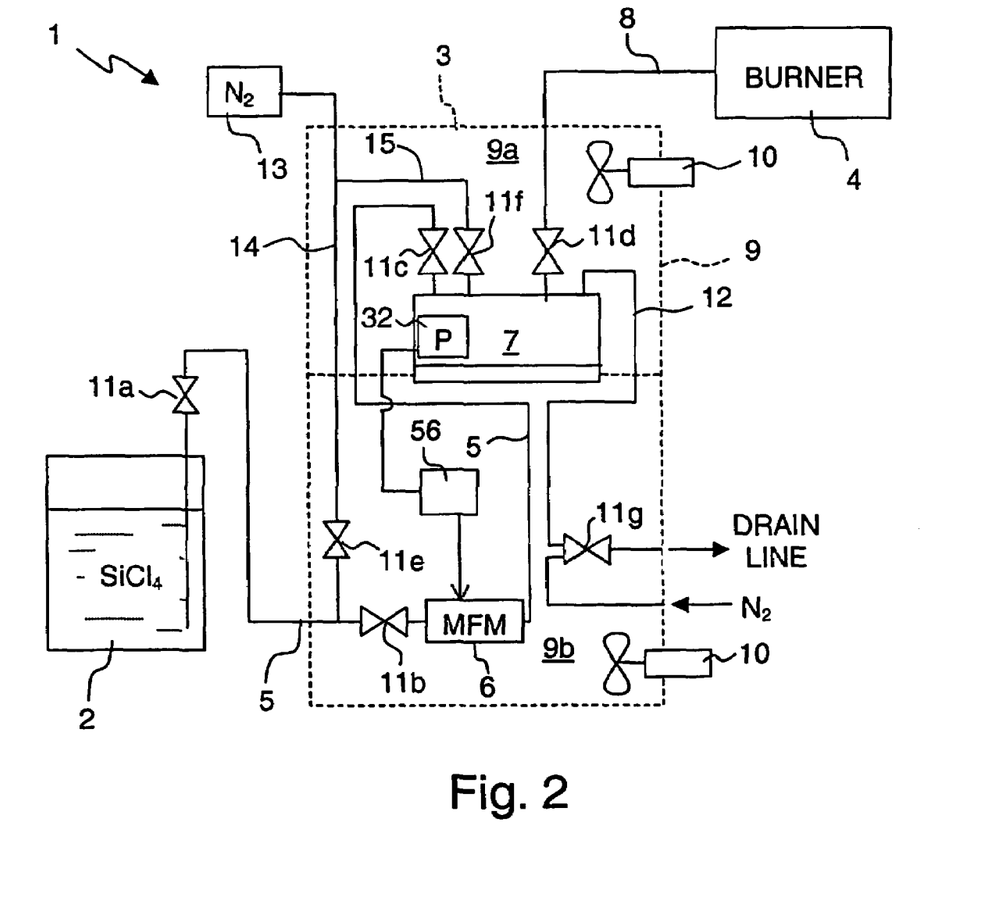
FIG. 2 is a more detailed representation of the apparatus of FIG. 1.

With reference to FIG. 2, which illustrates the deposition apparatus 1 in greater detail, vaporizing unit 3 comprises a vaporizer 7 that is in fluid communication with the tank 2, through a first line 5, for receiving the liquid reactant. Preferably, a flow control valve 6, in particular a mass flow meter (MFM), is positioned along line 5 for controlling the flow of the received liquid reactant. A valve 11a may also be positioned along line 5 at the exit of tank 2, for opening or closing the duct of line 5. Line 5 is advantageously provided with two further valves 11b and 11c, positioned at the entrance of vaporizing unit 3 upstream the flow control valve 6 and at the entrance of vaporizer 7, respectively.

A second line 8 connects vaporizer 7 with burner 4 to allow feeding to burner 4 the vapor exiting vaporizer 7. Line 8 may be provided, at the exit of vaporizer 7, of a valve 11d that allows regulating the vapor pressure inside vaporizer 7. Moreover, the second line 8 is advantageously heated at a predetermined temperature (for example 100° C.) and is preferably provided of a temperature sensor (not shown) for temperature control.

Vaporizing unit 3 preferably comprises a cabinet 9 having a first compartment 9a for containing the vaporizer 7 and a second compartment 9b for containing the final portion of pipes connected to the vaporizer 7 and corresponding flow control valves, including the final portion of line 5 and valve 6. The first and the second compartment 9a, 9b are preferably maintained at different temperatures, for example 90° C. in the first compartment 9a and ambient temperature in the second compartment 9b, and are provided with respective fans 10 for controlling the temperature therein.

The liquid feed tank 2 is advantageously located in a different room with respect to cabinet 9, so as to prevent risks for the technicians in case of liquid leakage from tank 2. Burner 4 is typically located inside a deposition chamber, which can be in the same room of cabinet 9 or in a different room.

Preferably, vaporizing unit 3 further comprises a purging hydraulic circuit for purging vaporizer 7 and the various ducts of the deposition apparatus 1 after use. Purging hydraulic circuit comprises a source 13 of purging gas, such as $N_2$, and a duct 14 connecting the source 13 with the line 5. Duct 14 may be provided with a valve 11e positioned inside the second compartment 9b of cabinet 9. A further duct 15, T-connected with duct 14, communicates with vaporizer 7 and is advantageously provided with a valve 11f positioned inside the second compartment 9b of cabinet 9.

Vaporizer 7 is also preferably connected, by means of a drain duct 12, to a drain line for draining operations. In particular, exit duct 12 is connected to a first inlet of a two-way valve 11g, whose outlet is connected to the drain line and whose second inlet is for passage of purging gas, for example coming from source 13.

All parts of the apparatus 1 that are apt to contact the reactant, in either liquid or vapor form, are preferably realized in electro-polished stainless steel, in order to avoid particle entrainments and corrosion.

Figure 3:
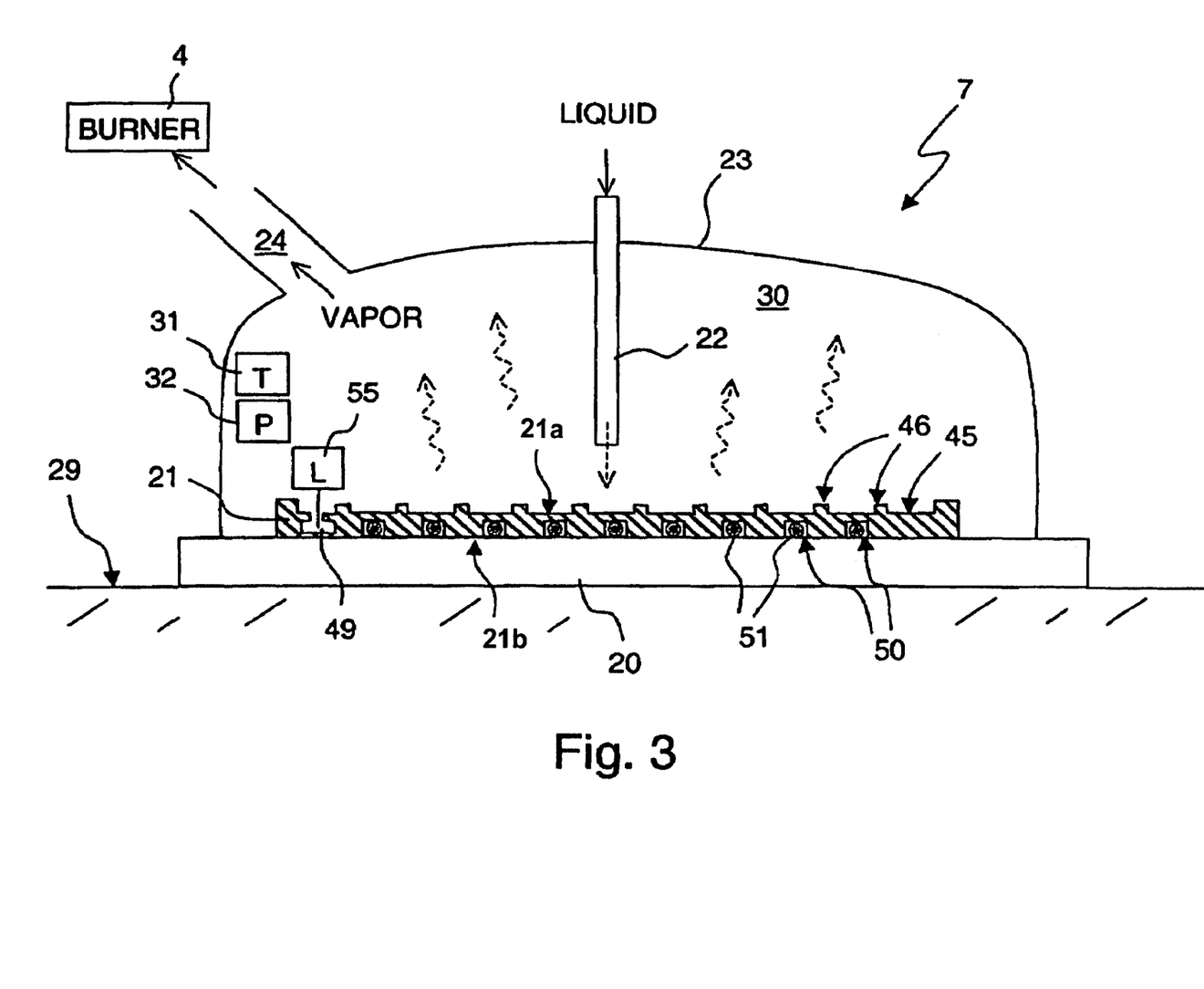
FIG. 3 shows a vaporizer according to the present invention.

With reference to FIG. 3, vaporizer 7 preferably comprises a support base 20 suitable to be fixed (in a known way, for example by bolts) to a horizontal wall 29 of cabinet 9, a vaporizing plate 21 positioned over the support base 20, a liquid reactant feed duct 22 for feeding the liquid reactant onto the vaporizing plate 21 and a bell-like cap 23 for collecting the vapor generated by the vaporizing plate 21. The space between cap 23 and support base 20 defines a vaporization chamber 30. Vaporizer 7 preferably comprises a temperature sensor 31 and a pressure sensor 32 of a known type positioned inside the vaporization chamber 30, for monitoring temperature and pressure during the process. Cap 23 has a vapor exit 24 communicating with burner 4 via line 8.

Preferably, vaporizing plate 21 is a disk-like member made of metal, for example of electro-polished stainless steel, and its two faces define, in use, an upper face 21a for liquid vaporization and a lower face 21b positioned on the support base 20. The upper face 21a has a substantially flat and horizontal vaporization surface 45 and a plurality of walls 46 delimiting a liquid flow channel, which extends substantially on the entire upper face 21a. In particular, the surface 45 and the walls 46 define the bed and the lateral edges of the channel, respectively. The channel is upward open, so as to allow vapor rising. As better observable from the top view of FIG. 4, the flow channel defines a tortuous path for the liquid, here indicated with a dashed line and with reference number 48. In the particular embodiment here illustrated, a plurality of concentric annular edges 46a-46g delimit a plurality of annular channel sectors, or annular surface regions, 45b-45g. Each edge 46 has a respective opening 47 to allow passage of liquid from one annular region to the other. The flow path 48 extends windingly from the center of vaporizing plate 21 towards the periphery.

Figure 4:
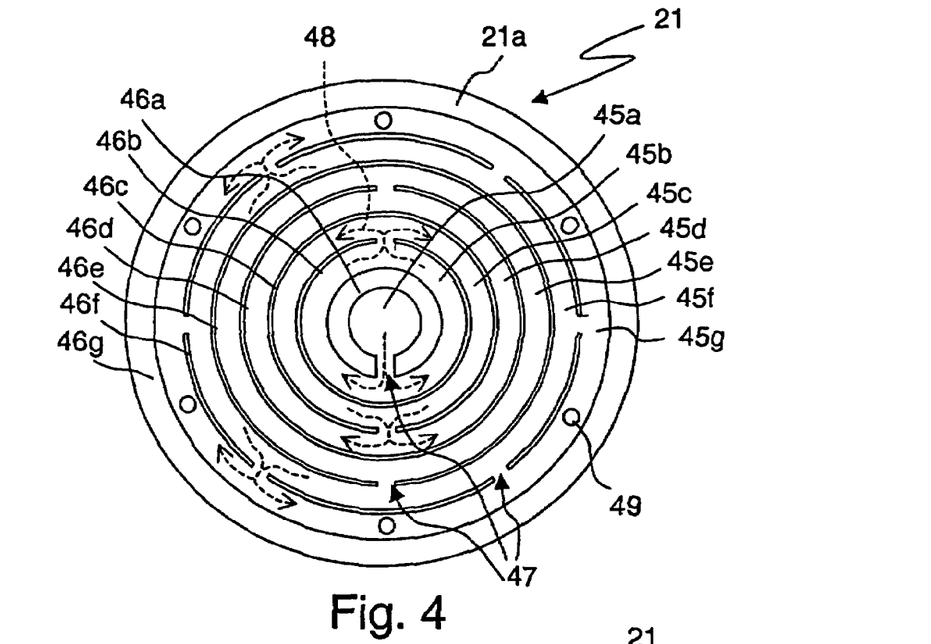
FIG. 4 is a top view of a vaporizing plate, which is part of the vaporizer of FIG. 3.

A central surface region 45a of the upper face 21a, delimited by a central edge 46a, is positioned underneath the liquid reactant feed duct 22 to receive the liquid flow. The central edge 46a has an opening 47 to allow passage of liquid towards a first annular surface region 45b, which, in turn, is externally delimited by a second edge 46b. The second edge 46b has an opening 47 in a position that is diametrically opposite to that of the opening of the first edge 46a, so as to force the liquid to cover all the surface of the first annular surface region 45b before flowing into a second annular surface region 45c, external to the first.

The particular embodiment of FIG. 4 has, besides the central region 45a and the central edge 46a, six annular surface regions 45b-45g and six further annular edges 46b-46g. The four edges 46b-46e are thinner than the central edge and each of them has an opening opposite the one of the previous edge. The last-but-one edge 46f has a plurality of equidistant openings 47 to allow the liquid to flow into the outer annular surface region 45g at several points. The outer surface region 45g may have a plurality of wells 49 for collecting the liquid in excess (i.e. the liquid that has not evaporated). Each well 49 may be provided with a liquid filling sensor 55, for example a IR sensor, apt to detect the presence of liquid in the respective well 49. The outer edge 46g delimits externally the outer surface region 45g and is preferably thicker and higher than edges 46b-46g.

The edges 46a-46g shall have a height greater than a minimum thickness of liquid reactant required to generate vapor under film or nucleate boiling regime, the film and nucleate boiling regimes being two of the possible boiling regimes of a liquid, as later explained in greater detail. More precisely, the height of the edges 46a-46g shall be greater than the diameter of the bubbles in the liquid under boiling. In particular, For a generic liquid, the bubble diameter (in meters) is given by;

$$d = \left(\frac{\pi \cdot \sigma}{g \cdot (\rho_l - \rho_v)}\right)^{0.5}$$

where σ is the surface tension of the liquid (in N/m), g is the acceleration of gravity (9.81 m/s²), $\rho_l$ is the liquid phase density in Kg/m³ and $\rho_v$ is the vapor phase density in Kg/m³. For $SiCl_4$, the diameter of the bubbles is about 1.8 mm. Therefore, in the case of $SiCl_4$, the height of the edges 46a-46g shall be greater than 1.8 mm.

Figure 5:
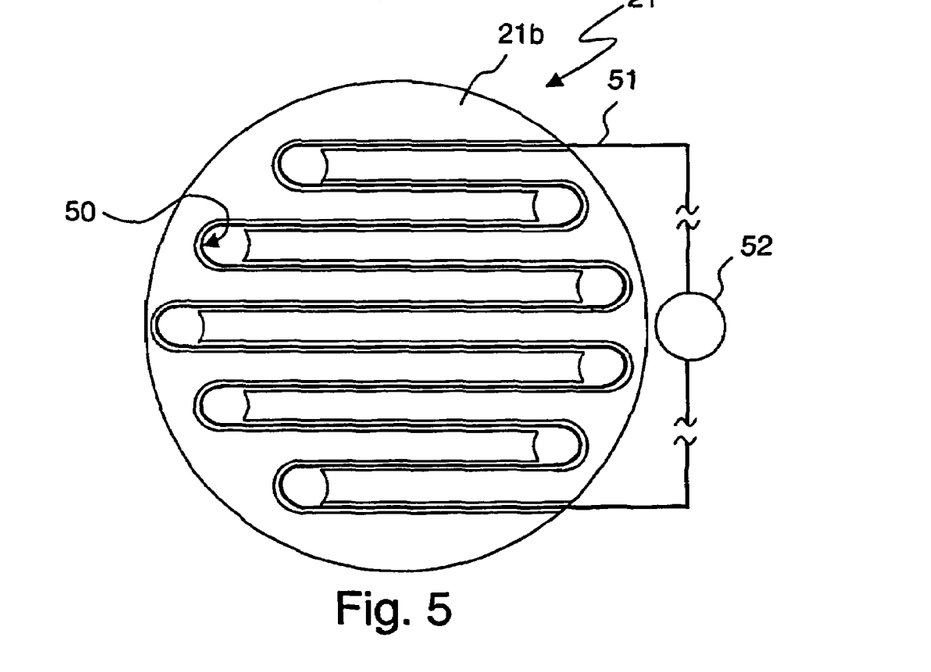
FIG. 5 is a bottom view of the vaporizing plate of FIG. 4.

As shown in the bottom view of FIG. 5, the vaporizing plate 21 has a lower portion suitable to be associated to a heating system. In particular, the lower face 21b defines a seat 50, in the form of a continuous groove, to host a metal wire 51, which is part of the heating system. Groove 50 extends as a serpentine to cover substantially the whole area of the plate 21. Metal wire 51 is connected to an electrical circuit, in particular to an electric current generator 52, so as to be able to heat the plate 21 at a predetermined operating temperature T when crossed by electrical current. In the particular example here illustrated, the groove 50 has a plurality of linear and parallel sections joined by a plurality of circular sections, which allow an easy positioning of wire 51.

The vaporizing plate 21 is preferably provided with a temperature sensor (not shown) to detect the temperature of the heated surface 45. The operating temperature T needed for complete vaporization of the liquid on the plate 21 depends on the type of liquid reactant and on the liquid flow rate. If the flow rate increases, a higher temperature is required to vaporize the higher amount of liquid. The temperature may advantageously be varied during the process. The temperature T shall be above the minimum temperature at which nucleate boiling of the liquid occurs, and preferably above the minimum temperature at which film boiling of the liquid occurs. In the case of $SiCl_4$, the minimum temperature to have nucleate boiling is about 80° C. and the minimum temperature to have film boiling is about 100° C.

Figure 6:
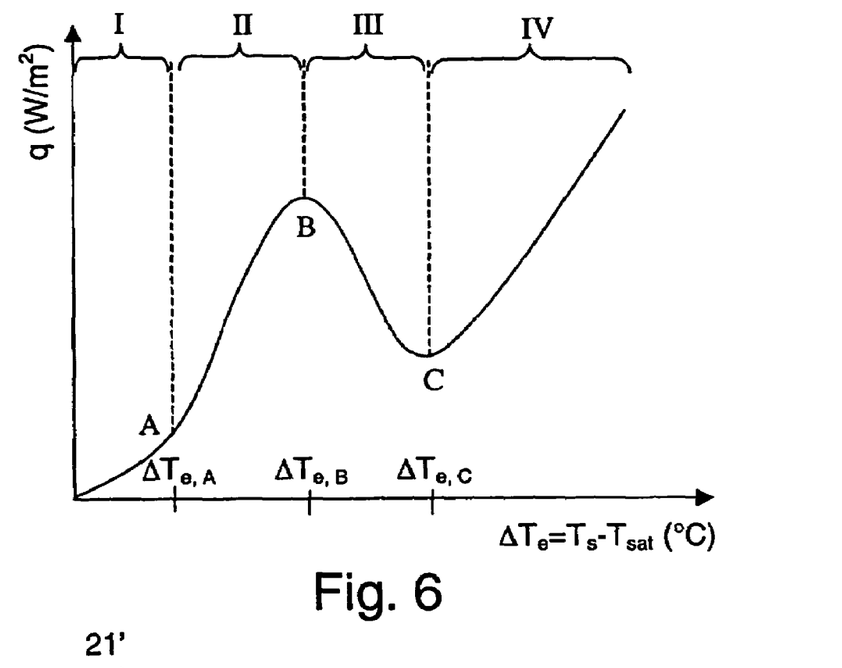
FIG. 6 is a graph showing the different boiling regimes of a liquid.

The different possible boiling modes (or regimes) are illustrated in the graphic of FIG. 6. Roman numbers I, II, III and IV identify free convection, nucleate, transition and film modes, respectively. Abscissa axis indicates the excess temperature $\Delta T_e$, which corresponds to the difference between the surface temperature $T_s$ and the saturation temperature $T_{sat}$ and ordinate axis indicates the heat flux.

Point A separates free convection, wherein there is insufficient vapor in contact with the liquid phase to cause boiling at the saturation temperature, from nucleate mode, wherein bubbles form at nucleation sites and separate from the surface and wherein, as the temperature further increases, vapor escapes as jets or columns.

The boiling region between points B and C, termed transition boiling, unstable boiling, or partial film boiling, is a region wherein bubble formation is so rapid that a vapor film or blanket begins to form on the surface. At any point on the surface, conditions may oscillate between film and nucleate boiling, but the fraction of the total surface covered by the film increases with increasing $\Delta T_e$.

Point C, which identifies the start of the film mode, is also known as the Leidenfrost point. Film boiling exists for $\Delta T_e \geq \Delta T_{e,C}$ where $\Delta T_{e,C}$ is the excess temperature at the Leidenfrost point (C). At point C, the heat flux q is a minimum, and the heated surface is completely covered by a vapor blanket. Heat transfer from the surface to the liquid occurs by conduction through the vapor. As the surface temperature is increased, radiation through the vapor film becomes significant and the heat flow increases with increasing $\Delta T_e$. An exhaustive description of the different boiling regimes can be found in the book "Fundamentals of heat and mass transfer" of Incropera and De Witt, John Wiley & Sons. Film boiling regime is also described in "Film Boiling Heat Transfer From a Horizontal Surface", P. J. Berenson, Journal of Heat Transfer, August 1961.

As previously stated, the vaporizing process of the present invention is conducted under nucleate or film regime, preferably under film regime. For the purposes of the present invention, with "nucleate or film regime" it is intended a regime that corresponds to the nucleate regime, the film regime, or the transition regime between the nucleate and film regimes, wherein the behavior is partially that of nucleate regime and partially that of the film regime, as previously described.

The operating conditions of the process previously described are therefore different from those described in U.S. Pat. No. 5,356,451, wherein bubble formation is inhibited (no boiling) and from those described in U.S. Pat. No. 5,078,092, wherein the temperature of the heating element is maintained below the temperature where nucleate or film boiling of the liquid occurs.

In use, in particular during a deposition process, the deposition apparatus 1 operates with valves 11a, 11b, 11c and 11d open and valves 11e, 11f and 11g closed. Therefore, the liquid reactant flows from the tank 2 to vaporizer 7 through duct 5, crossing valves 11a, 11b, 11c and the flow control valve 6. The liquid reactant enters the vaporization chamber 30 of vaporizer 7 via the feed duct 22 and flows onto the central region 45a of the upper surface 45 of the vaporizing plate 21. The continuous flow forces the liquid to move towards the outer annular surface regions 45b-45g along the liquid path 48, by passing through openings 47 of edges 46. The front of the liquid move forward till it has reached the power required for complete vaporization.

The flow rate of liquid reactant is such that the liquid forms a film of a thickness lower than the height of edges 46 but higher than the diameter of a bubble in the liquid when the liquid boils, i.e. than the minimum thickness required to have nucleate or film boiling. Before flowing the liquid, the temperature of the vaporizing plate 21 is increased to the temperature T above specified (i.e. at a temperature at which nucleate boiling, and preferably film boiling, of the liquid occurs), by flowing electrical current into wire 51. The operating temperature needed for complete vaporization on the vaporizing plate 21 depends on the type of the liquid reactant.

Film mode boiling requires a higher plate temperature than nucleate mode boiling, but can advantageously be performed at a higher liquid flow rate so as to obtain a higher vapor flow rate.

During the process, the temperature and pressure sensors are continuously monitored to verify that there are not undesired variations of the operating conditions. If no variation or only small variations of the vapor flow rate is required, the set point of the temperature of vaporizing plate 21 can be maintained constant during the process, so as the set point of liquid flow rate. Small variations of the vapor flow rate may be obtained by simply varying the liquid flow rate through flow control valve 6, at constant plate temperature. A variation of the liquid flow rate results in fact in a variation of the extension of wetted area on the vaporizing plate 21, e.g. up to the border of the plate. It is therefore preferred to have the vaporizing plate 21 not completely filled with liquid, so as to allow small variations of the liquid flow rate to produce corresponding variations of the vapor flow rate, without intervening on the plate temperature. The pressure sensor 32 is advantageously monitored to control the operative set point of flow control valve 6, so as to maintain the pressure inside the vaporization chamber 30 at the desired value. In particular, a control circuit 56 connecting the pressure sensor 32 to the flow control valve 6 is apt to receive the signal from the pressure sensor 32, to determine the difference between the detected pressure and a reference pressure, and to vary the liquid flow rate through valve 6 so as to minimize said difference.

To produce greater variations of the vapor flow rate, both the liquid flow rate and the plate temperature are preferably varied, so as to vaporize a greater amount of liquid. Again, the signal of pressure sensor 32 is used in a control loop to determine the new set points for the plate temperature and for the liquid flow rate.

Moreover, during the process, the fill sensors positioned inside wells 49 are monitored to detect the presence of liquid therein. If liquid is present within wells 49, the efficiency of the process may decrease, since part of the liquid is not vaporized. To overcome the problem, the temperature of the vaporizing plate 21 may be increased until the wells 49 are emptied out.

The vapor generated inside vaporization chamber 30 is collected by cap 23 at the desired pressure, and leaves chamber 30 through exit 24. Then, the vapor flows through line 8 (crossing valve 11d) and reaches burner 4, together with other gases, in particular at least together with a combustible gas and a combustion sustaining gas. For example, the burner 4 may be fed with $SiCl_4$, $N_2$ as innershield gas, $O_2$ as outershield gas and a mixture of $CH_4$ and $O_2$. Moreover, the vapor reactant, or glass precursor material, may be admixed with a carrier, preferably $O_2$, before being fed to the burner.

At the burner, a flame is generated and a reaction transforming the reactant vapor into glass soot particles takes place. The flame is directed towards a deposition target (such as a rod), so that the glass soot may be deposited and a glass soot preform may be grown.

When the process is over, valves 11a, 11b, 11c and 11d are closed. At predetermined times, the deposition apparatus 1 may be purged to avoid accumulation of substances. Purging is performed by first draining reactant residuals from vaporizer 7 via drain duct 12 and by successively flowing nitrogen ($N_2$) into the various ducts of vaporizing unit 3 and into vaporizer 7. In greater detail, draining is performed by closing all the valves of the vaporizing unit but the two-way valve 11g, which is switched so as to connect the drain duct 12 to the drain line, thus allowing vapor residuals inside vaporizing chamber 30 to be drained. Successively, while keeping valves 11a and 11d closed, valves 11b, 11c, 11e and 11f are opened and the two-way valve 11g is switched so as to connect the source of purge gas with the drain line. As a result, $N_2$ flows into duct 14 and into the final portion of duct 5, passing through valve 11b, flow control valve 6, and valve 11c, and then enters into vaporization chamber 30. At the same time, $N_2$ flows into duct 15, passing through valve 11f, and again enters into vaporization chamber 30. $N_2$ may leave vaporization chamber 30 via duct 8 or via duct 12.

Figure 7:
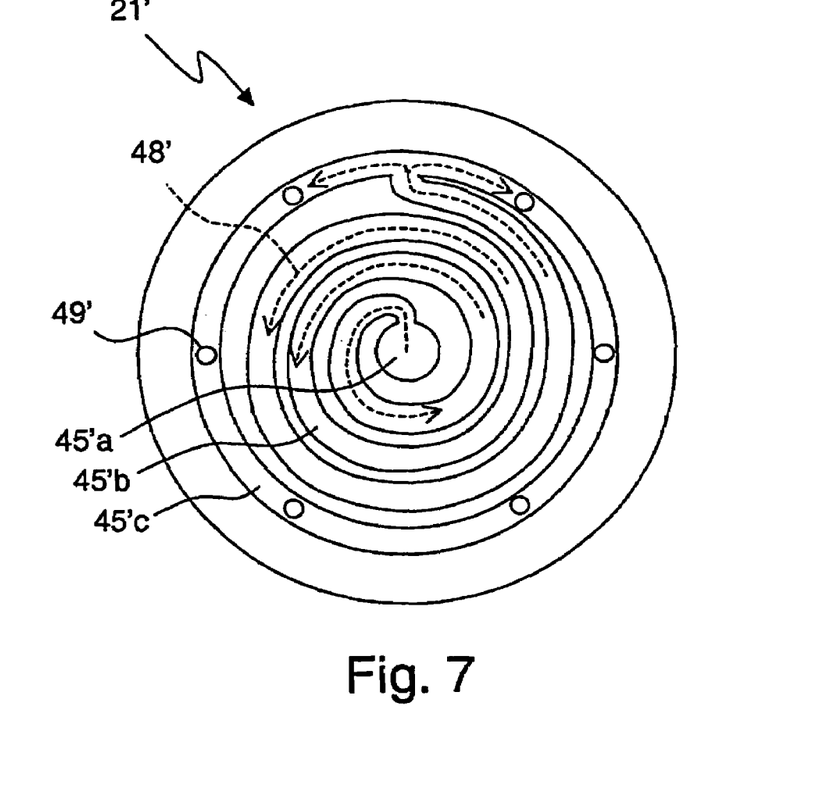
FIG. 7 shows a different embodiment of the vaporizing plate.

FIG. 7 shows an alternative embodiment of the vaporizing plate, here indicated with 21'. The vaporizing plate 21' defines a spiral-like path 48' for the liquid, delimited by edges 46'. The spiral-like path 48' starts from a central surface portion 45'a, extends along a spiral surface portion 45'b and ends in an outer annular surface portion 45'c. The outer annular surface portion 45'c has a plurality of wells 49', having the same function as in the embodiment of FIG. 4. The lower portion of vaporizing plate may be identical to that of plate 21. Same considerations are valid for the height of edges 46' as for edges 46 of plate 21.

It can be appreciated that the embodiments of FIGS. 4 and 7 are only illustrative examples and that various vaporizing plates, having different types of path, may be realized in accordance with the teaching of the present invention.

Figure 8:
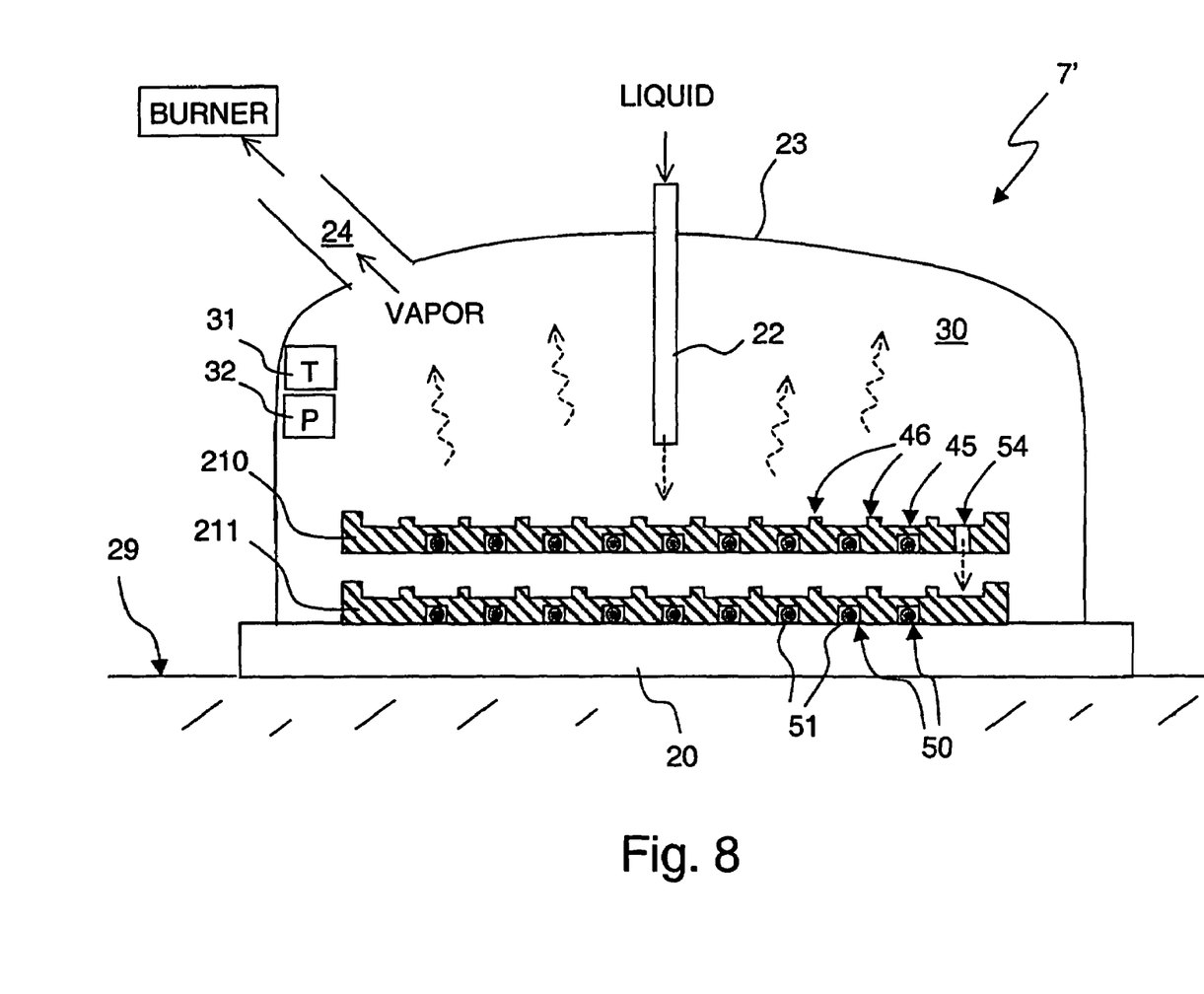
FIG. 8 shows a different embodiment of the vaporizer.

FIG. 8 represents an alternative embodiment of the vaporizer of the present invention, here indicated with 7', which may be advantageously used when higher vapor flow rates are required. Vaporizer 7' differs from vaporizer 7 of FIG. 3 in that it comprises two superimposed vaporizing plates, in particular an upper vaporizing plate 210 and a lower vaporizing plate 211, which may have substantially the same shape and dimensions, or be different from each other. The upper vaporizing plate 210, which is provided with support means not illustrated, is positioned underneath the exit of liquid feed duct 22 so as to receive the liquid in its center region but, differently from vaporizing plate 21, has at least one passing hole 54 in its outer region in place of wells, so as to cause the liquid reactant that has not vaporized before reaching that region to leak onto the lower vaporizing plate 21b. The lower vaporizing plate 211 is apt to receive the liquid leaking from the upper vaporizing plate 210 in its outer portion, and to make it flow, as a result of the shape of the path on its surface, towards its center. In its center region, the lower vaporizing plate 211 may have a well (not shown) for collecting the residual liquid, preferably provided with a temperature sensor.

Plates 210 and 211 may be both of the same type, for example of the type disclose in FIG. 4 or in FIG. 7, or of a different type. Moreover, a different number of plates can be arranged inside the vaporization chamber 30, depending on the amount of vapor that has to be generated and, accordingly, of the amount of liquid reactant that has to be vaporized.

It will be apparent to those skilled in the art that various modifications and variations can be made to the disclosed embodiment of the present invention without departing from the scope or spirit of the invention. For example, the upper surface of the vaporizing plate may have a slight slope, in particular a negative slope in the direction of liquid flow, to allow the liquid to easily flow on it. Moreover, the vaporizing plate herein above described may be substituted by a metal body of any shape, provided that it defines on its top surface a path for the liquid which allows formation of a film of liquid of sufficient thickness and provided it can be associated to a heating system capable of heating the body at a temperature sufficient to have at least nucleate boiling, and preferably at a temperature sufficient to have film boiling. A different embodiment (not shown) of the deposition apparatus may also include a plurality of vaporizing units of the type previously described, each provided with its own vapor exit line. Those lines may be connected so as to admix the different vapor flows before feeding to the burner.

It can be appreciated that the vaporizer of the present invention is of very reduced dimensions and that it is possible to vaporize large amounts of liquid by superimposing several vaporizing plates, still maintaining very compact the entire assembly. Moreover, as previously stated, it is possible to locate the liquid tank in a different room, so avoiding risks for the technicians in case of liquid leakage. A further advantage of the assembly of the present invention is that it does not require mass flow controllers in hot zones of the apparatus, since the only mass flow controller, i.e. the valve 6, which regulates the flow of liquid to the vaporizer 7, operates at ambient temperature.

Experimental Tests

The Applicant has performed a series of experimental tests to verify the effectiveness of the deposition apparatus of the present invention in generating a stable flow of glass precursor material, suitable for a glass soot deposition process.

A vaporizing plate like the vaporizing plate 21 of FIGS. 3, 4 and 5 was used, having the following dimensions:
  external diameter: 230 mm;
  height: 12 mm;
  width of annular surface regions 45b-45g: 10 mm;
  diameter of central surface region 45a: 35 mm;
  width first annular edge 46a: 10 mm;
  width annular edges 46b-46f: 2.5 mm;
  height annular edges 46a-46f: 2.5 mm;
  height annular edge 46g: 4.6 mm;

groove 50: ten linear and parallel sections at 20 mm from each other, joined by nine circular grooves of 26 mm diameter.

The experiments were performed under the following operating conditions:

liquid reactant: $SiCl_4$;

temperature of vaporizing plate 21: 145° C.;

temperature inside the upper compartment 9a of cabinet 9: 90° C.

Those conditions, together with the liquid flow rates indicated below, were sufficient for boiling the liquid under the film regime.

The experiments were performed for a time of 420 min, using three different flow rates of liquid reactant, namely 30, 45 and 55 g/min. The vapor pressure inside the vaporization chamber 30 was detected at time intervals of 30 min. The following table reports the values of the detected pressures, expressed in mbar.

|            | Liquid flow rate |         |         |
| ---------- | ---------------- | ------- | ------- |
| Time (min) ↓ | 30 (g/min)     | 45 (g/min) | 55 (g/min) |
| 30  | 1073 (mbar) | 1102 | 1355 |
| 60  | 1075 | 1104 | 1357 |
| 90  | 1076 | 1105 | 1358 |
| 120 | 1077 | 1106 | 1358 |
| 150 | 1077 | 1106 | 1356 |
| 180 | 1076 | 1105 | 1359 |
| 210 | 1077 | 1104 | 1357 |
| 240 | 1078 | 1104 | 1358 |
| 270 | 1076 | 1106 | 1355 |
| 300 | 1076 | 1105 | 1356 |
| 330 | 1077 | 1107 | 1355 |
| 360 | 1078 | 1104 | 1356 |
| 390 | 1076 | 1103 | 1356 |
| 420 | 1076 | 1103 | 1353 |

It can be appreciated that the process according to the present invention allows obtaining vapor pressures that satisfy the requirements of current glass soot deposition processes and are particularly stable. In particular, it can be observed that, under the test conditions herein above described, the pressure fluctuations are lower than 5%, more precisely lower than about 0.46%.

What is claimed is:

1. A method for vaporizing liquid reactants in a process for producing a glass soot preform, comprising:
    providing a vaporizing plate comprising a horizontal flow channel;
    forming in said horizontal flow channel a continuous stream of liquid reactant, wherein said continuous stream of liquid reactant has a thickness sufficient for generating vapor and bubbles under film or nucleate boiling regime;
    heating said vaporizing plate to a temperature sufficient to generate vapor and bubbles under film or nucleate boiling regime from said continuous stream of liquid reactant in said horizontal flow channel; and
    generating vapor and bubbles under film or nucleate boiling regime from said continuous stream of liquid reactant in said horizontal flow channel via said heating.

2. The method according to claim 1, wherein said forming a continuous stream of liquid reactant comprises continuously flowing said liquid reactant into said horizontal flow channel, wherein said horizontal flow channel is delimited by lateral walls whose height is equal to at least said thickness sufficient for generating vapor and bubbles under film or nucleate boiling regime.

3. The method according to claim 2, wherein said heating said vaporizing plate comprises heating a surface delimiting said horizontal flow channel.

4. The method according to claim 1, further comprising identifying a pressure sufficient for use in producing a glass soot preform, collecting said vapor until said pressure is reached and conveying said vapor subjected to said pressure to a vapor utilization site.

5. The method according to claim 1, further comprising flowing said continuous stream of liquid reactant into a further channel positioned at a lower level with respect to said horizontal flow channel.

6. A process for manufacturing a glass preform, comprising:
    vaporizing a liquid reactant via the method according to any one of claims 1-4, 5 to generate a vapor reactant;
    feeding said vapor reactant to a burner for forming glass soot particles; and
    depositing said glass soot particles onto a deposition target to grow said glass preform.

* * * * *